C. J. HEINRICHS.
LOCK FOR MOTOR VEHICLES AND THE LIKE.
APPLICATION FILED DEC. 11, 1918.
1,313,891.
Patented Aug. 26, 1919.
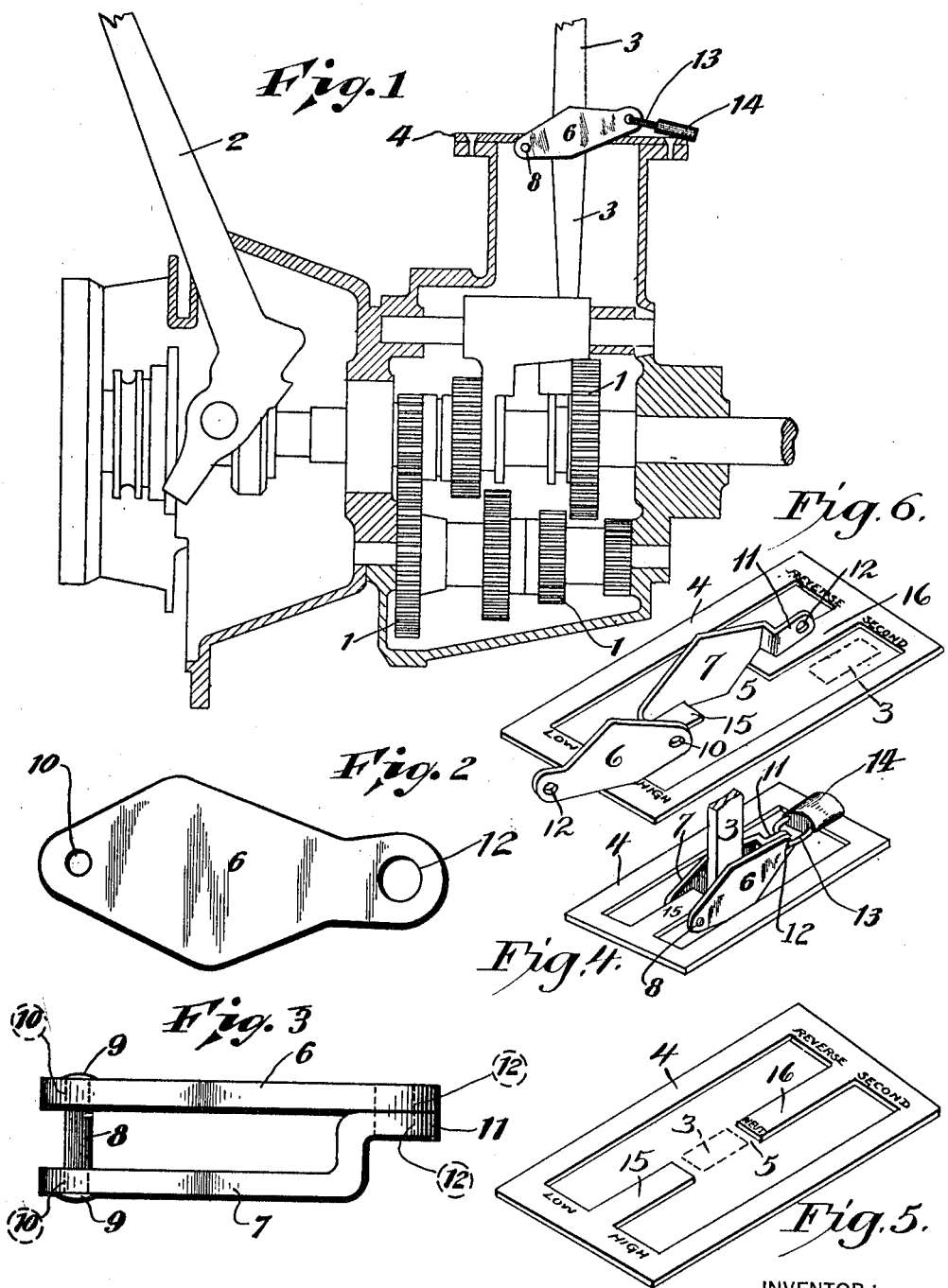
INVENTOR:
Cleveland J. Heinrichs,
BY
Hugh N. Wagner,
ATTORNEY

UNITED STATES PATENT OFFICE.

CLEVELAND J. HEINRICHS, OF ST. LOUIS, MISSOURI, ASSIGNOR OF ONE-HALF TO FRED W. ARNOLD, OF ST. LOUIS, MISSOURI.

LOCK FOR MOTOR-VEHICLES AND THE LIKE.

1,313,891.  Specification of Letters Patent.  Patented Aug. 26, 1919.

Application filed December 11, 1918. Serial No. 266,181.

*To all whom it may concern:*

Be it known that I, CLEVELAND J. HEINRICHS, a citizen of the United States, residing at the city of St. Louis, in the State of Missouri, have invented certain new and useful Improvements in Locks for Motor-Vehicles and the like, of which the following is a specification.

This invention is a lock for motor vehicles or the like, particularly adapted for use in such vehicles having an H-plate or the like and in combination with such H-plate or similar member. Its merits are simplicity, cheapness, and efficiency.

In the accompanying drawings forming part of this specification, in which like numbers of reference denote like parts wherever they occur, Figure 1 is a side elevation of the gears and connected parts in one form of motor vehicle (the gear case and the like being broken away to show the interior), and the gear-shifting lever being shown in relation to the said gears and to the H-plate;

Fig. 2 is a side elevation of the preferred form of this lock, looking thereat in the same way as seen in Fig. 1;

Fig. 3 is a bottom plan view of the lock;

Fig. 4 is a perspective view showing the lock in position in connection with the H-plate and gear-shifting lever;

Fig. 5 is a perspective view of the H-plate; and

Fig. 6 is a perspective view of the H-plate and the initial position of the lock while the same is being applied thereto.

The gears 1 are inclosed and mounted in the usual manner. The clutch lever 2 operates as is usual in such constructions.

The gear-shifting lever 3 is arranged so as to move gears 1 into mesh with coöperating gears, as is common, and passes through the H-plate 4, projecting upwardly, as shown in Fig. 1, to a point convenient to the hand of the operator.

In each figure of the drawings in which the gear-shifting lever 3 appears, it is shown in "neutral" 5. By way of illustration, the other customary positions for the lever 3 are indicated in the drawings as "low", "second", "high", and "reverse".

In the form of this device illustrated the same consists of a pair of plates 6 and 7 joined together by a pin 8 having upset ends 9, the said pin 8 passing through holes 10.

Plate 7 is formed with an angular shoulder or lug 11, which, as best seen in Fig. 3, lies against one end of plate 6 when in locking position, while the opposite ends of plates 6 and 7 are adapted to be spaced apart on pin 8 on which they loosely slide, being thus spaced apart by lever 3, which passes between the same. Holes 12 in plates 6 and 7 allow passage therethrough of the hasp 13 of a padlock 14, which is preferably of the more secure kind commonly called pin locks; but any kind of padlock can be used.

All the parts are made of substantial weight and thickness and hardness.

Fig. 4 shows the lock in position, as does also, from a different viewpoint, Fig. 1.

When it is desired to apply the hereinabove-described lock to a motor vehicle, the lever 3 is removed from the neutral position 5 to "second". The pin 8 is slipped under tongue 15 of the H-plate 4, and plate 7 is laid in the position shown in Fig. 6 alongside of tongue 15 and tongue 16. The lever 3 is then moved back to "neutral" 5, and plate 6 is moved from the position shown in Fig. 6 to that shown in Figs. 1 and 4, and thereupon the hasp 13 of the padlock 14 is passed through holes 12 in plate 6 and plate 7 and snapped locked. To remove the lock, the reverse order of movements is made. While movement of lever 3 to "second" has been herein described as allowing the insertion of pin 8 under tongue 15, yet it is obvious that movement of lever 3 to "reverse" will serve equally well, in which case it will be necessary to turn the lock over, *i. e.*, so as to have plate 6 where plate 7 is shown in the drawings. Similarly, by turning the lock around, and over as may be necessary, lever 3 can be moved to either "low" or "high" and pin 8 inserted under tongue 16.

Having thus described this invention, I hereby reserve the benefit of all changes in form, arrangement, order, or use of parts, as it is evident that many minor changes may be made therein without departing from the spirit of this invention or the scope of the following claims.

I claim:

1. In combination with the H-plate of an automobile or the like, a pair of plates having holes through both ends and a pin passing through the said holes at one end thereof and affording a slidable and pivotal connection for the said plates at that end, and a padlock, the hasp of which passes through the holes at the other end of the said plates, the ends of the plates being spaced apart and engaging the opposite edges of one of the lips of the H-plate and the pin connecting the plates fitting under and engaging the said lip, the opposite end of the said plates and the said padlock being above the opposite lip of the said H-plate and the gear-shifting lever being locked in "neutral" between the said plates.

2. In combination with the H-shape plate of an automobile, a pair of plates, each having openings at opposite ends, one of said plates being angularly bent to provide a bearing surface to engage against the companion plate, the remaining portions of the plates being spaced apart to provide an opening for a shift lever when in neutral position and to engage the opposite edges of one of the lips of the H-shape plate, a pin extending through the openings in and connecting the spaced ends of the plates, and adapted to engage under the lip of the H-shape plate which is engaged by the plates to prevent lateral movement of the plates, and a lock engaging the openings in opposite ends of the plates above the top of the H-shape plate, the angular bent portion resting on the top of the opposite central lip of the H-shape plate, whereby the plates prevent movement of the shift lever when the latter is moved to neutral position.

In testimony whereof I hereunto affix my signature.

CLEVELAND J. HEINRICHS.

Copies of this patent may be obtained for five cents each, by addressing the "Commissioner of Patents, Washington, D. C."